United States Patent [19]

Németh

[11] Patent Number: 5,273,130
[45] Date of Patent: Dec. 28, 1993

[54] ENGINE SUPPORTING FRAME FOR MOTOR VEHICLE

[75] Inventor: József Németh, Budapest, Hungary

[73] Assignee: Ikarusz Karosszéria és Jármügyár, Budapest, Hungary

[21] Appl. No.: 925,235

[22] Filed: Aug. 3, 1992

Related U.S. Application Data

[63] Continuation of Ser. No. 673,853, Mar. 21, 1991, abandoned, which is a continuation of Ser. No. 422,415, Oct. 17, 1989, abandoned.

[30] Foreign Application Priority Data

May 31, 1989 [HU] Hungary ............... 2783/89

[51] Int. Cl.⁵ ..................... B60K 5/02; B60K 5/12
[52] U.S. Cl. ..................... 180/292; 180/300
[58] Field of Search ............... 180/291, 292, 293, 298, 180/299, 300, 312

[56] References Cited

U.S. PATENT DOCUMENTS

| | | | |
|---|---|---|---|
| 1,398,024 | 11/1921 | Jacobs | 180/312 |
| 1,592,736 | 7/1926 | Kent | 180/292 |
| 1,698,453 | 1/1929 | Sardeson et al. | 180/299 X |
| 1,959,113 | 5/1934 | Sherman | 180/299 |
| 1,975,910 | 10/1934 | Trott | 180/300 |
| 2,065,665 | 12/1936 | Dietrich | 180/299 |
| 2,107,606 | 2/1938 | Gemmer | 180/292 X |
| 2,296,181 | 9/1942 | Perkins | 180/292 X |
| 4,030,705 | 6/1977 | Bontrager | 180/298 X |
| 4,040,640 | 8/1977 | Begg | 180/292 |
| 4,240,517 | 12/1980 | Harlow, Jr. et al. | 180/299 X |
| 4,593,786 | 6/1986 | Tate | 180/291 |
| 4,770,427 | 9/1988 | Howell et al. | 180/298 X |
| 4,962,825 | 10/1990 | Albright et al. | 180/292 |

FOREIGN PATENT DOCUMENTS

| | | | |
|---|---|---|---|
| 2712083 | 9/1978 | Fed. Rep. of Germany | 180/299 |
| 0007766 | 1/1982 | Japan | 180/292 |
| 0279929 | 11/1988 | Japan | 180/299 |
| 2183572 | 6/1987 | United Kingdom | 180/300 |

Primary Examiner—Brian L. Johnson
Attorney, Agent, or Firm—Schweitzer Cornman & Gross

[57] ABSTRACT

A motor vehicle frame having (i) a plurality of frame mounting supports enclosing an area, and (ii) an engine supporting frame releasably and directly attached to the motor vehicle frame by the frame mounting supports, the engine supporting frame having (a) at least two rigid longitudinal beams, (b) at least two transverse beams, the transverse beams being substantially perpendicularly firmly attached to the longitudinal beams, (c) devices for attaching an engine to the engine supporting frame, (d) a transmission, and (e) auxiliary devices for operating the engine and the transmission, when the engine is attached to the auxiliary devices (c) the center of gravity of the mounted engine, the transmission and the auxiliary devices is located within the area enclosed by the frame mounting supports, whereby a balanced load is provided by the engine supporting frame.

4 Claims, 4 Drawing Sheets

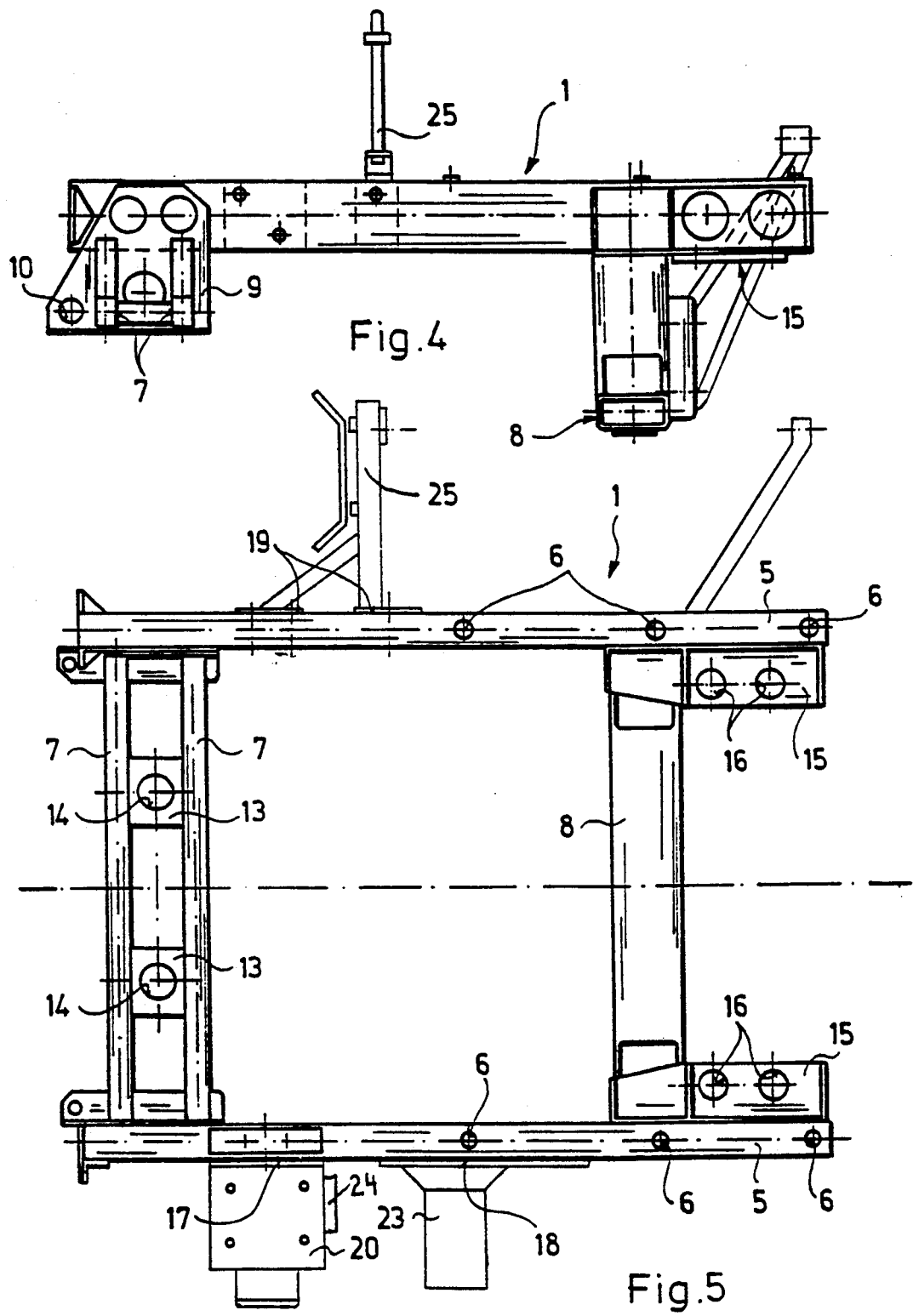

ENGINE SUPPORTING FRAME FOR MOTOR VEHICLE

This is a continuation of application Ser. No. 673,853, filed on Mar. 21, 1991 which is a continuation of application Ser. No. 422,415, filed on Oct. 17, 1989, both now abandoned.

FIELD OF THE INVENTION

The present invention relates to a supporting frame for attaching the driving mechanism of motor vehicles to the vehicle frame, such as of autobus drives.

BACKGROUND OF THE INVENTION

In the prior art structural units of the autobuses, parts of the drive, such as the clutch and transmission, gear box and the auxiliary devices, such as the generator, air-filter, compressor, silencer, are mounted generally independently from the frame. These elements are generally attached to the main frame through accessory racks mounted into the frame structure, through holding devices, or by inserting some elastic element, such as a rack made of rubber.

A drawback of such traditional arrangements and modes of attachment is that reactive moments arising during the operation of the motor vehicle, a direct and considerable load is exerted on the vehicle frame. Depending on the load extraordinary local stresses may occur in the vehicle frame. These are partly large local stresses, and further, the constantly changing dynamic loading, and the generally symmetrical arrangement of the frame structure about the longitudinal axis of the vehicle, together lead, according to practical experience, to localized peak stresses, which negatively influence the useful life of autobuses.

The frame structure has to be excessively reinforced to eliminate local stresses, and this requires the undue expenditure of material, weight and other costs.

In addition to the aforementioned disadvantages, the above added reinforced mode by the prior art does not meet modern assembly or maintenance requirements while it is also complex, time consuming, and costly.

Hungarian patent No. 183,364 describes a mounting frame carrying the vehicle engine which can be connected to the understructure of the motor vehicle in a releasable way. This enables pre-assembled suspension of the engine and optionally the gear box assembled therewith. This frame is connected at four points to the understructure by supporting brackets by using horizontal clamping screws disposed in sleeves. The frame is a structure welded from longitudinal and transverse beams, and the engine is mounted on the supporting brackets of the frame.

Although the rearward extending frame enables a certain amount of pre-assembly, and enables installation of various types of engines or frames supporting various transmissions to the understructure of the same vehicle, also in this case, one has to consider that result of symmetrical arrangement and support whereby reactive moments due to drive and mass forces can lead to undesired local stress peaks which are indirectly transferred to the frame and bring about the aforementioned disadvantages. The problem is increased by the subsequent installation and arrangement of auxiliary devices having considerable mass.

DESCRIPTION OF THE INVENTION

The aim of the present invention is to eliminate the aforesaid deficiencies of the prior art and to provide an improved support frame with the aid of which stress peaks exerted there onto are efficiently reduced, and stresses occurring during operation are transferred onto the frame in a more acceptable manner, while reducing the cost incurred in its assembly, repair and maintenance.

The present invention is based on the recognition that when the entire operative drive train, is arranged on the support frame so, that by a balanced arrangement thereof the frame loads will be transferred equally to all parts of the frame structure of the vehicle chassis. By the torque-free construction of the carriers of the support frame the reactive forces or reactive moments can be transferred to the frame structure in a balanced manner, without substantial stress peaks.

In solving the task we started from the supporting frame as described in the introduction hereof, which is a construction welded from longitudinal and transverse beams and can be releasably connected to the frame structure of the motor vehicle, such as an autobus. In accordance with the present invention this was then improved so that the supporting frame is provided with two longitudinally arranged support beams spaced from each other and being equally rigid with respect to torsion and to bending and front and rear transverse support beams for connecting the longitudinal beams, wherein a unitary structure comprised of the engine, clutch and transmission is attached to the transverse support beams. These are attached to the longitudinal beams other, auxiliary means, as at least these are required for operating the engine, such as the air-filter, compressor, muffler, radiator, generator, etc. the longitudinal beams of the support frame are attached to the vehicle frame through at least a part of the length of the longitudinal beams in a balanced, load transferring manner.

According to a suitable embodiment of the present invention the supporting frame structure and the longitudinal beams of the frame of the vehicle are provided with at least two bores each for containing attaching bolts, and the common center of gravity of the drive components and of their auxiliary device is located within the area demarcated by these bores. The bores in the longitudinal beams of the supporting frame for attaching it to the vehicle frame and the locations of attachment of the auxiliary means, are suitably asymmetrically arranged at least when viewed in the longitudinal direction.

Some of the auxiliary means are attached to the longitudinal beams of the supporting frame indirectly, by accessory support.

DESCRIPTION OF THE DRAWING

The invention is described in detail with reference to the drawings wherein,

FIG. 4 is a partial longitudinal cross-sectional view of the supporting frame of FIG. 2; and FIG. 5 is a partial top view of supporting frames according to FIGS. 1-4.

DESCRIPTION OF A PREFERRED EMBODIMENT

Figure 1:
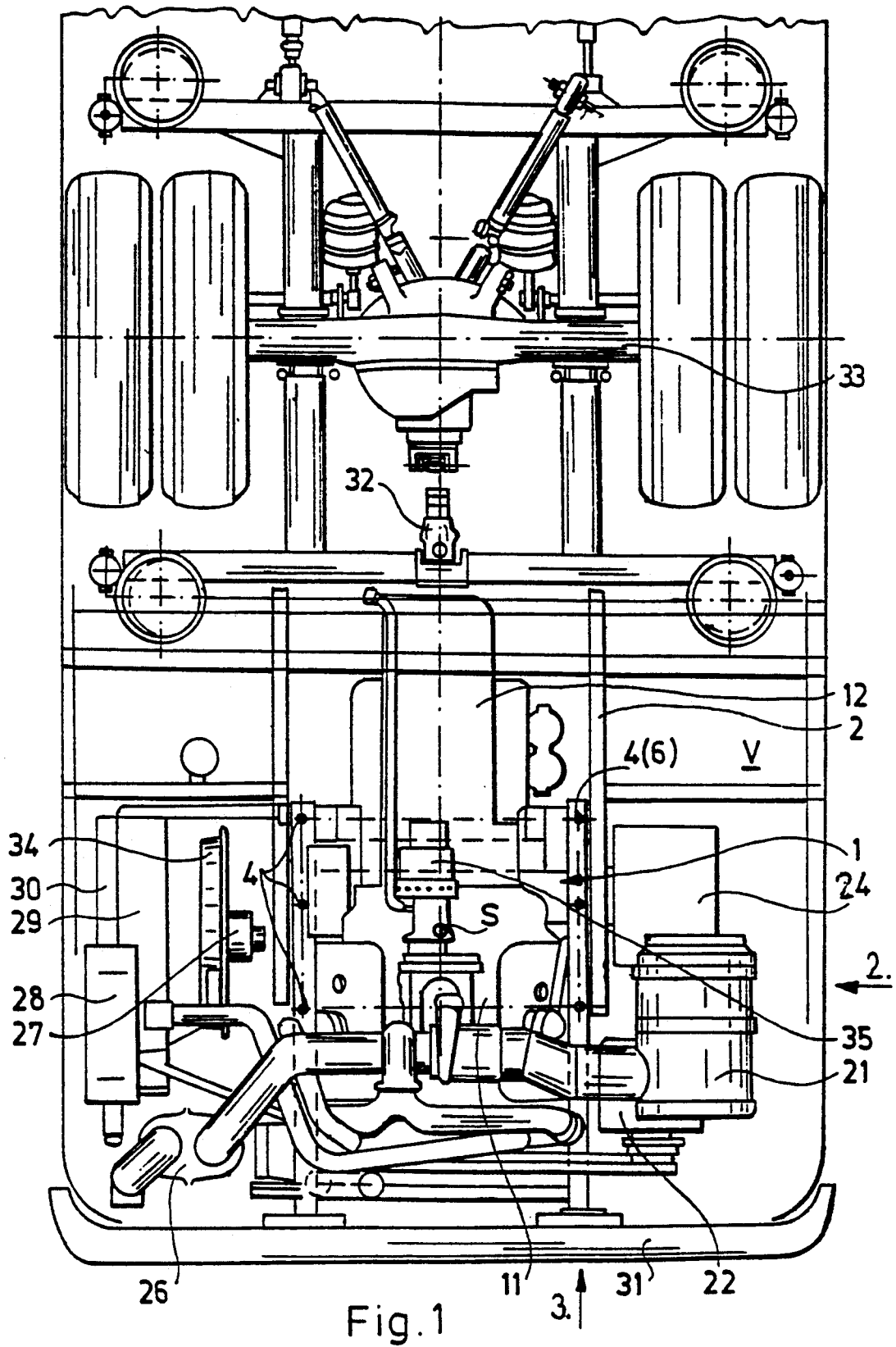
FIG. 1 is a schematic top view of a part of an autobus drive system provided with a supporting frame according to the invention.
Figure 3:
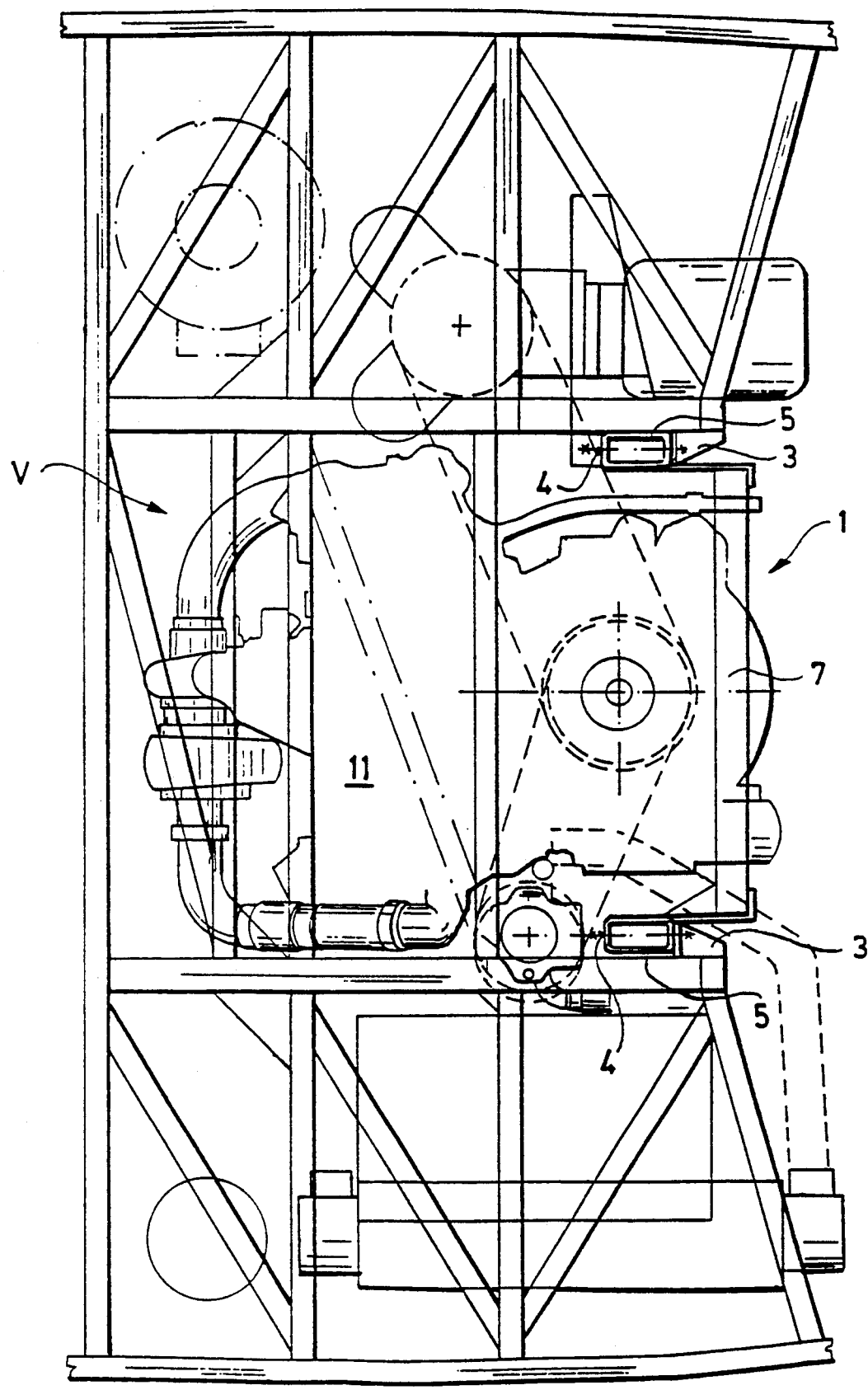
FIG. 3 is a rear view as seen in direction of the arrow 3 in FIG. 1.

FIG. 1 shows an engine supporting frame 1 of a large vehicle with rear drive, such as an autobus. As it becomes clear from FIGS. 1 and 3, the engine supporting frame 1 (shown in a thicker line) is attached to the longitudinal beams 2 of a vehicle frame structure V. In the illustrated case the engine support frame 1 is seated on supports 3 of the vehicle frame V., and is releasably attached thereto by bolts 4. Longitudinal beams 5 of the engine support frame 1 are provided with three bores 6 each which are arranged on both sides opposite to each other (see FIGS. 1 and 5), for accommodating the bolts 4.

As shown in FIGS. 4 and 5, the longitudinal beams 5 arranged on both sides of the engine support frame 1, are interconnected by forward transverse beams 7 and 8 by the V-shaped spaced apart rear transverse beam 8. In accordance with the present invention the longitudinal beams 5 are rigid with respect both to bending and torsion, and are closed profile steel beams and transverse beams 7 and 8 also having a closed profile, are welded to the longitudinal beams. As shown in FIGS. 4-5, both the longitudinal beams 5 and the transverse beams 7 are welded through juncture plates 9, which in the present embodiment are formed with an aperture 10 as a draft lug. (FIG. 4).

It can be seen in the drawing that transverse beams 7 and 8 are formed essentially in the shape of a cradle, in which cradle there is disposed a drive unit such as in the illustrated embodiment a six cylinder diesel engine 11, a clutch (not shown separately), and a transmission 12, mounted in the cradle by rubber mounting (not shown). Openings 14 are formed in the attaching plates 13 welded between the transverse beams 7, and openings 16 are formed in the attaching profiles 15 on both sides of the transverse beam 8. Attaching profiles 15 reinforce the junctures of the longitudinal beams 5 with the transverse beams 8.

In accordance with the present invention, not only the drive unit of the engine 11 with the transmission 12 are arranged on the engine supporting frame 1, but also all of the auxiliary means required for operation, and so that balanced load transfer can be realized to the longitudinal beams 2 of the frame V.

In accordance with the invention various supports are attached to the longitudinal beams 5 of the supporting frame 1 directly or indirectly at the junctures 17-19. At the juncture 17 a support 20, shown indicated with a thin line, is attached to the longitudinal beam 5, the support 20 has arranged thereon the air filter 21 and the compressor 22 (FIG. 1). At the juncture 18 a support 23 is attached to the longitudinal beam 5, and has the oil tank 24 arranged thereon. A generator 35 is attached to a support 23. At the juncture 19 a support 25 is bolted to the longitudinal beam 5, and a muffler 26, ventilator motor 27, replenishing tank 28, radiator 29, oil-cooler 30, and confusor 34 are disposed thereon (FIG. 1).

Figure 2:
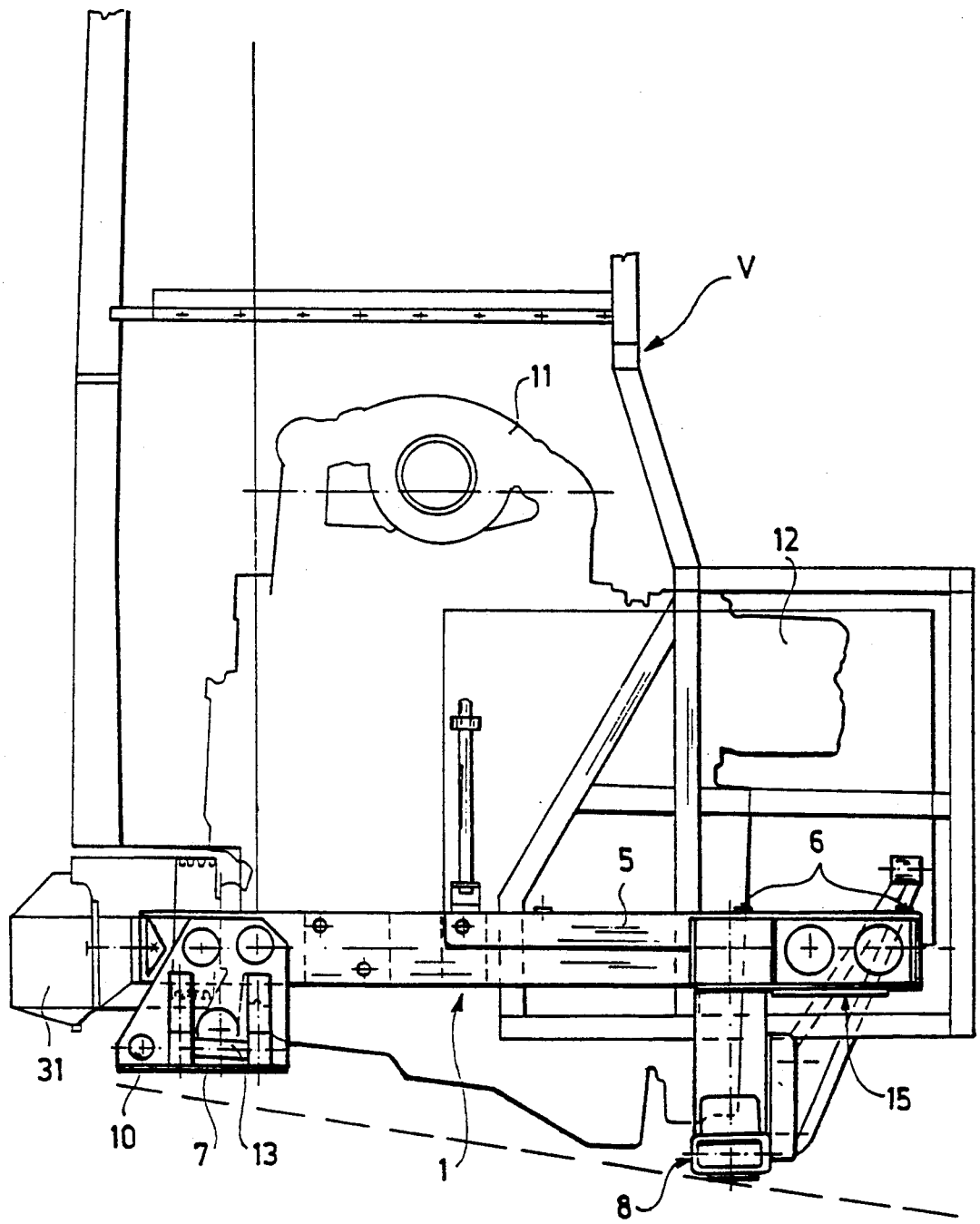
FIG. 2 is a side view in direction of the arrow 2 in FIG. 1.

As it can be seen from FIGS. 1 and 2, a bumper 31 is attached to the outer end of the longitudinal beams 5 of the supporting frame 1. The driving system is connected in a manner known per se to the driving axle 33 through the transmission shaft 32.

In accordance with the present invention the aforementioned driving unit and auxiliary means are arranged on the supporting frame 1 so that their common center of gravity is in at S. This means that resultants of gravitational forces act in the center of gravity S, and so do the resultants of the moments of inertia and rotation. In accordance with the present invention the common center of gravity S is located within the area enclosed by the bores 6 of the screws 4, which is indicated in FIG. 1 with a thin dash-and-dot line.

The bores 6 in the longitudinal beams 5 of the supporting frame 1 are asymmetrically arranged when viewed in the longitudinal direction, and so are the intersections 17-19 of the auxiliary means. This asymmetric arrangement here correspond to the asymmetrically occurring loads.

As a result of the arrangement according to the present invention the reactive moments resulting from the totaling of the moments of inertia resulting from the drives and masses is taken up by the supporting frame 1 as a distributed load and is transferred by it through the supports 3 that partially support the longitudinal beams 5 to the frame structure V of the vehicle. This effectively reduces peaks of moments. Equalization of the resultant reaction moment is aided by the appropriate arrangement of the auxiliary means, since the asymmetrically occurring load—in accordance with asymmetric suspension—enables the most favorable possible load transfer in the frame structure V of the vehicle. The present invention also enables a displaced arrangement of the engine 11.

In accordance with the invention we provide for, the junctures 17-19 of the auxiliary means being disposed in the least loaded areas of the longitudinal beams 5 of the supporting frame 1. Thus, the loads created thereby, even when they occur at the same time, can be favorably transferred to the frame structure V.

In use this balanced load transfer can be determined by calculating or measuring the resultant of the arising loads after the drive and the auxiliary means were attached to the supporting frame 1. When this is known, one can determine the locations of attachment of the engine and the auxiliary means, at which balanced loading can be realized. The location and the number of bores 6 on the longitudinal beams 2, as well as places of intersection 17-19 can be determined at those points, at which the calculated or measured loads are well balanced. In accordance with the invention the generally dynamic loads are exerted on the stronger portions of the supporting frame 1, which while the smaller loads are exerted or transmitted to the parts the loading of which is known. The stress distribution on the supporting system, even when considering dynamic loading, thus becomes balanced and the structure thus is equally loaded.

All the auxiliary means, independently of the vehicle, can be completely preassembled onto the supporting frame 1 according to the present invention. Thus, in this preassembled state the engine after connection to a test bench and establishing the necessary electrical and control connections, can be tested for starting, and control or adjusting measurements. The preassembled supporting frame 1 can be easily transported by a fork lift truck. The drive arranged on the supporting frame 1 can be easily serviced and repaired even principal parts can be simply and easily accessed and exchanged. After work is completed on the aggregate mounted on the supporting frame, it can be easily repaired and mounted onto the desired location and fixed with screws.

Downtime of the vehicle can be minimized by having ready extra drive aggregates preassembled onto supporting frames 1. These can be quickly swapped into a vehicle and thus the bus can continue on its travel.

A further advantage of the supporting frame 1 according to the invention is that it enables the design and formation of improved engine space layouts and the frame structure V of the vehicle can be also considerably simplified. The totality of the above advantages has proven itself in practice also to result in more favorable vehicular and use characteristics which result in substantial advantages for the operator.

I claim:

1. A motor vehicle main frame including interconnected members defining an area, (i) a plurality of frame mounting supports located within the area, and (ii) a driving engine supporting rigid frame releasably and directly attached to the motor vehicle main frame by said frame mounting supports, the engine supporting rigid frame having (a) at least two longitudinal beams having first ends, (b) at least two transverse beams, said transverse beams being substantially perpendicularly and firmly attached to said longitudinal beams, (c) means for attaching a driving engine for said motor vehicle to the engine supporting rigid frame, (d) a transmission adapted to be connected to the driving engine, (e) auxiliary means connected torque-free to the engine supporting rigid frame for operating the driving engine and the transmission, and (f) a bumper attached to the first ends of said longitudinal beams, when the driving engine is attached to said means (c) the center of gravity of the mounted driving engine, transmission, and auxiliary means is located within an area enclosed by the frame mounting supports, whereby a balanced load is provided by said engine supporting rigid frame.

2. The motor vehicle main frame of claim 1, wherein said beams of said engine supporting rigid frame are welded together.

3. The motor vehicle main frame of claim 1, wherein said auxiliary means comprises at least one air filter, compressor, muffler, radiator, oil cooler, and electric power generating means.

4. The motor vehicle main frame of claim 1, wherein at least a part of said auxiliary means is attached to a longitudinal beam of the engine supporting frame indirectly through at least one accessory carrier.

* * * * *